United States Patent [19]
Sorensen

[11] Patent Number: 4,464,771
[45] Date of Patent: Aug. 7, 1984

[54] PHASE-LOCKED LOOP CIRCUIT ARRANGEMENT

[75] Inventor: Bendt H. Sorensen, Meinier, Switzerland

[73] Assignee: Motorola, Inc., Schaumburg, Ill.

[21] Appl. No.: 364,956

[22] Filed: Apr. 2, 1982

[51] Int. Cl.³ .............................................. H04L 7/02
[52] U.S. Cl. .................................. 375/120; 307/269; 328/63
[58] Field of Search .................. 375/120, 119, 80-82; 360/41, 51; 307/511, 514, 516, 518, 526-528, 262, 269; 328/109, 110, 133, 134, 155, 63; 329/50; 331/1 A, 11, 12

[56] References Cited
U.S. PATENT DOCUMENTS 4,180,701 12/1979 Louth et al. .................. 375/120 X
4,371,975  2/1983 Dugan ............................. 375/120

*Primary Examiner*—Robert L. Griffin
*Assistant Examiner*—Albert W. Watkins
*Attorney, Agent, or Firm*—Joe E. Barbee

[57] ABSTRACT

The described invention relates to a phase-locked loop circuit arrangement for synchronizing an oscillator to a Non-Return-To-Zero data signal in which a transition from one potential level to another represents a data transition from one binary value to another.

A local clock signal is provided by means of a controllable oscillator and a phase comparator compares the phases of the data and clock singals with one another. The frequency of the oscillator is adjusted by means of a control signal in dependence upon an amount by which the phase of the data leads that of the clock signal and vice versa. In any cycle of the clock signal in which the phase of the clock signal leads that of the data and in which no data transition occurs the application of a control signal to the oscillator is inhibited.

The invention is particularly applicable to teletext receivers.

4 Claims, 4 Drawing Figures

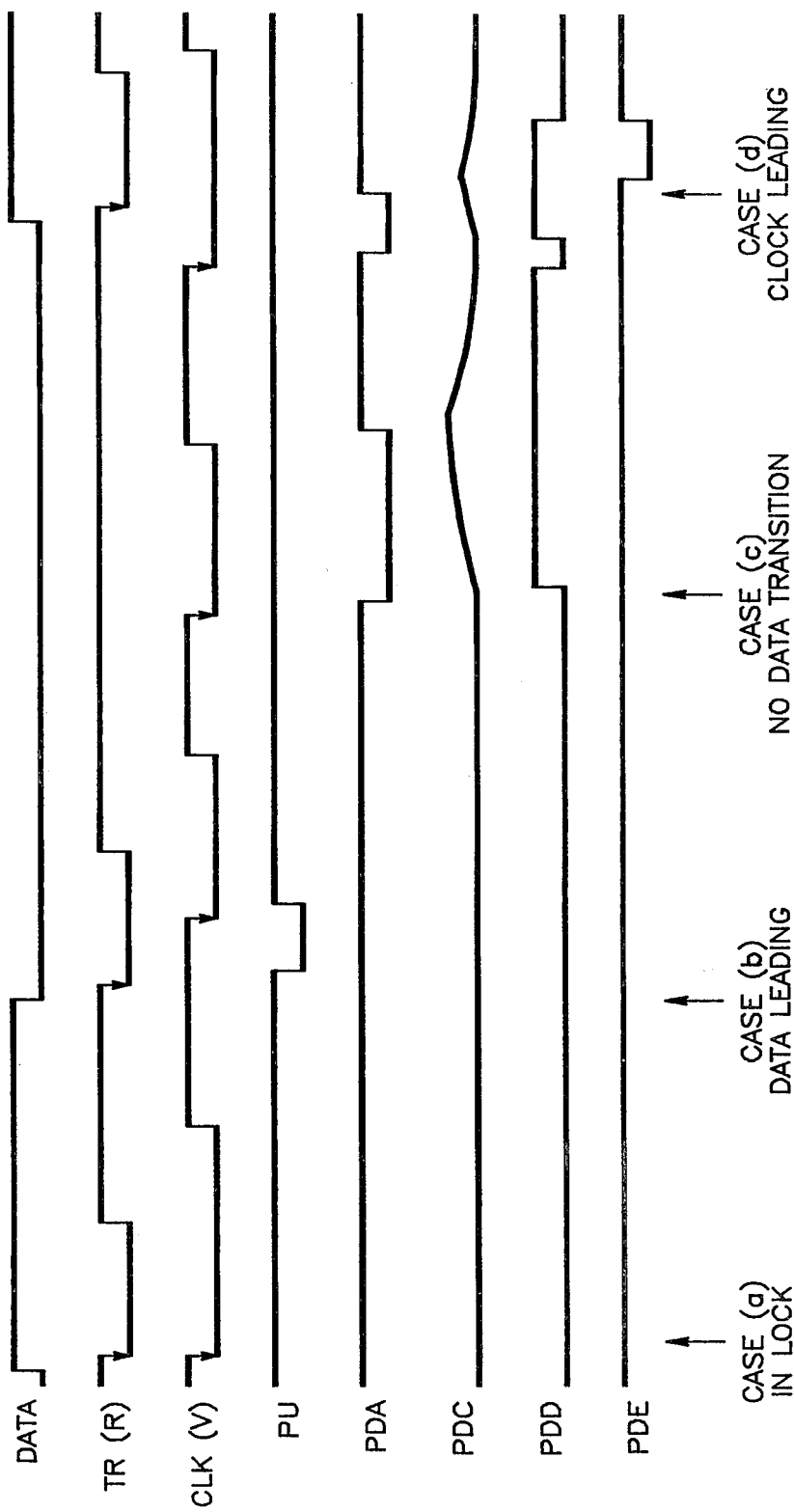

PHASE-LOCKED LOOP CIRCUIT ARRANGEMENT

TECHNICAL FIELD

This invention relates to a phase-locked loop circuit arrangement for synchronising an oscillator to a NRZ (Non-Return-to-Zero) data signal.

There are numerous different ways of coding data for transmission but when a high data rate is required and only a relatively narrow bandwidth is available for transmission then the NRZ code is often chosen. A typical example of the use of this code is in Teletext transmission where coded information is transmitted during the vertical blanking interval of a television transmission.

The NRZ code has the advantage that for a given data rate a smaller bandwidth is required than for other more sophisticated codes. A disadvantage is that the code does not contain any clock information which is needed at the receiver for enabling decoding of the data. It is therefore necessary to generate a clock signal in the receiver and this is done by synchronising an oscillator to the transmitted data.

BACKGROUND ART

In one known arrangement for synchronising the oscillator a passive tuned LC-oscillator has been used to provide the clock signal and this oscillator is started by means of a clock run-in signal which is transmitted at the beginning of each data line. Once started by the run-in signal the oscillator "rings" during the remainder of the data line.

In another known arrangement the oscillator is provided in the form of a crystal oscillator which oscillates at a frequency equal to the transmitted data rate. This frequency is then delayed to obtain four clock signals of different, non-overlapping phases and each is compared with a transmitted clock reference, the best match being selected.

Both of the above known methods require expensive oscillating elements and also their performance is not entirely satisfactory.

BRIEF SUMMARY OF INVENTION

The invention seeks to provide a circuit arrangement for synchronising an oscillator to a NRZ data signal in which the above mentioned problems of known circuit arrangements are mitigated.

According to the present invention there is provided phase locked loop circuit arrangement for synchronising an oscillator to a NRZ (Non-Return-to-Zero) data signal in which a transition from one potential level to another represents a data transition from one binary value to another; the arrangement including a controllable oscillator for providing a clock signal; a phase comparator for comparing the phases of the data and clock signals with one another; means for applying a control signal to adjust the oscillating frequency of the oscillator in dependence upon an amount by which the phase of the data leads that of the clock signal and vice-versa the means for applying a control signal including means for inhibiting the application of a control signal to the oscillator during a cycle of the clock signal in which the phase of the clock signal leads that of the data and no data transition occurs.

The controllable oscillator may be a voltage controllable oscillator.

In an embodiment of the invention the phase comparator has a first output for providing an output signal indicative of the phase of the data leading that of the clock signal and a second output for providing an output signal indicative of the phase of the clock signal leading that of the data.

The means for inhibiting the application of a control signal to the oscillator may include gating means coupled to the second output of the phase comparator and arranged to be enabled by a data transition.

The gating means may be coupled to the second output of the phase comparator via a delay circuit which delays an output signal fed from the phase comparator and indicative of the phase of the clock signal leading that of the data during a clock cycle, and which feeds to the gating means a signal representative of the phase difference between the clock and data signals following the arrival of a data transition during that clock cycle.

The delay circuit may include capacitive means arranged to be charged at the beginning of a clock cycle in which the phase of the clock signal leads that of the data and to be discharged on arrival during that cycle of a data transition, the charge on the capacitor on the arrival of a data transition being proportional to the time elapsed between the beginning of the clock cycle and the data transition.

The delay circuit may also include a comparator having a first input coupled to the capacitive means and a second input coupled to a source of a reference potential, the comparator having an output coupled to the gating means.

Means may be provided for discharging the capacitive means at the end of a clock cycle in which the phase of the clock signal leads that of the data and in which no data transition occurs.

The phase comparator may be a digital phase comparator.

Means may be provided for resetting the digital phase comparator at the end of a clock cycle in which the phase of the clock signal leads that of the data and in which no data transition occurs.

The means for applying a control signal to adjust the oscillating frequency of the controllable oscillator may include a charge pump and filter circuit for converting digital signals derived from the digital phase comparator into an analogue voltage.

BRIEF DESCRIPTION OF DRAWINGS

An exemplary embodiment of the invention will now be described with reference to the drawings in which;

FIG. 4 is an explanatory waveform diagram illustrating the operaiton of the circuit arrangement of FIG. 3;

DETAILED DESCRIPTION OF THE INVENTION

Figure 1:
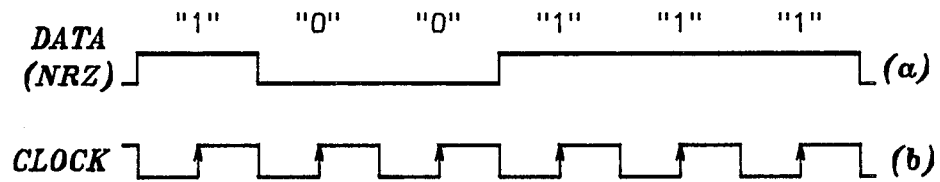
FIG. 1 illustrates the Non-Return-To-Zero code.

Referring now to FIG. 1, the waveform shown at line (a) illustrates the transmission of binary bits 100111 in the form of a Non-Return-to-Zero code in which the logical level of the data waveform only undergoes a transition when the data changes from one binary value to the other.

In order to decode an incoming datastream which is coded using the Non-Return-to-Zero code, it is necessary to use a clock signal of frequency twice that of the data rate. This clock signal is illustrated in line (b) of FIG. 1. It is necessary to maintain the clock signal in phase with the data signal and such that a positive going edge of the clock signal is in the middle of incoming data pulses.

If the data signal were to be continuously alternating between "1" and "0" it would be possible to generate the clock signal in the receiver by means of a conventional phase locked loop circuit. However, the incoming data will of course be varying in a random manner and since a data transition only occurs on the data line when the binary value of the data changes the use of a conventional phase lock loop circuit would result in a phase error between the data and clock signals in the receiver.

Figure 2:
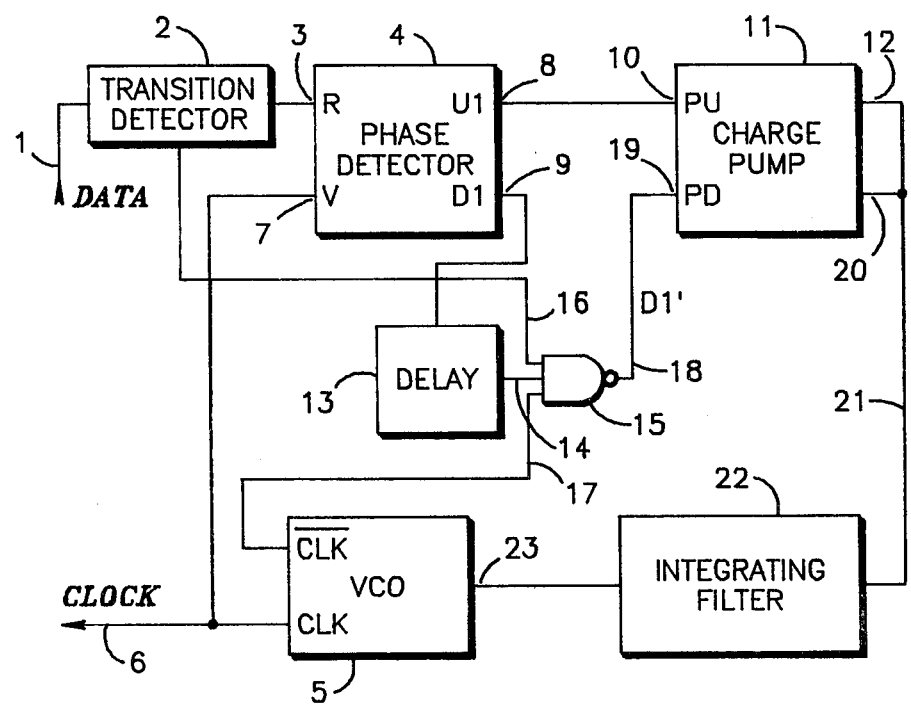
FIG. 2 is a very schematic block diagram of a phase lock loop circuit arrangement in accordance with the present invention.

This problem is overcome by means of the circuit arrangement in accordance with the present invention which is illustrated in FIG. 2 to which reference will now be made.

In FIG. 2 incoming data arriving at a data input terminal 1 and coded in NRZ code is fed via a transition detector 2 to a first input 3 of a phase comparator 4. A clock signal generated in the receiver by means of a voltage controlled oscillator 5 is fed to an output terminal 6 for utilisation and to a second input 7 of the phase comparator 4.

The phase comparator 4 has two outputs 8 and 9 and provides an output signal at the first output 8 if the phase of the data fed to the phase detector at its input termial 3 leads that of the clock signal fed to the input terminal 7. This output terminal 8 is connected to a pump up input 10 of a charge pump circuit 11 which converts the digital output signal fed from the phase detector into an analogue signal which appears at an output terminal 12 of the charge pump 11.

When the phase of the clock signal leads that of the data, the phase comparator 4 provides an output signal at the terminal 9 which is fed via a delay circuit 13 to one input 14 of a NAND gate 15. The NAND gate 15 also has an enabling input 16 fed with an output signal from the transition detector 2 and an enabling input 17 fed with complementary clock signals from the voltage controlled oscillator 5.

The NAND gate 15 has an output signal 18 which is connected to a pump down input 19 of the charge pump circuit 11. A pump down signal on the pump down input 19 of the charge pump 11 produces an analogue signal at an output terminal 20 of the charge pump circuit and this output terminal is connected to the output terminal 12 of the charge pump circuit 11 and via a connecting line 21 and an integrating filter 22 to a frequency control input 23 of the voltage controlled oscillator 5.

In operation a data signal arriving at the terminal 1 is fed to the transition detector 2 which produces a negative going pulse for each transition, positive or negative going of the data. This pulse is fed to the input 3 of the phase detector 4 whilst the clock signal output of the voltage controlled oscillator 5 is fed to the second input terminal 7 of the phase detector 4.

The phase detector 4 is a digital phase detector which compares the edges of the pulses of the two input signals and provides pulses on either the output 8 or the output 9 in dependence upon whether the phase of the data signal leads that of the clock or vice versa. The phase comparator 4 performs a phase comparison on each cycle of the input signals fed to it.

When the phase of the data leads that of the clock signal, the operation of the circuit is relatively straightforward. This is due to the fact that after a transition of the data there will always be a transition of the clock signal. Consequently, output pulses will appear at the output 8 of the phase detector representative of the phase difference between the data and the clock signal. These pulses are fed directly via the pump up input 10 of the charge pump circuit 11 to provide a control signal for the voltage controlled oscillator 5 which is fed to its control input 23 via the integrating filter 22.

The case where the phase of the clock signal leads that of the data is more complicated since at the time when a transition of the clock signal occurs it is not certain whether a transition of the data will take place or not. It is quite possible that the data will remain at its existing logical level. In this case, were the output 9 of the phase detector to be connected directly to the pump down input 19 of the charge pump circuit 11 a large phase error would be indicated where in reality no phase error might exist.

Consequently when the phase of the clock signal leads that of the data a transition of the clock signal at the input 7 of the phase detector will produce an output from the output 9 but this output is now stored by means of the delay circuit 13 until it is determined whether a data transition arrives during that clock cycle. Pending arrival of a data transition adjustment of the oscillator is prevented by means of the NAND gate 15 which is connected between the delay circuit 13 and the pump down input 19 of the charge pump circuit 11. This gate 15 is enabled by means of a complementary clock signal fed from the voltage controlled oscillator 5 to input 17 of the gate and also by means of the pulse output of the transition detector 2 which is fed to the input 16 of the gate 15.

If a data transition does occur during the clock cycle in which the phase of the clock signal leads that of the data, then the gate 15 will be enabled by the pulse fed from the transition detector 2 and the delay circuit 13 will release a pulse to the pump down input 19 of the charge pump circuit 11 which represents the phase difference between the clock and data signals. If no data transition occurs during the clock cycle then the gate 15 remains blocked and no adjustment of the voltage controlled oscillator 5 is made. In this case the phase detector 4 is reset.

Figure 3:
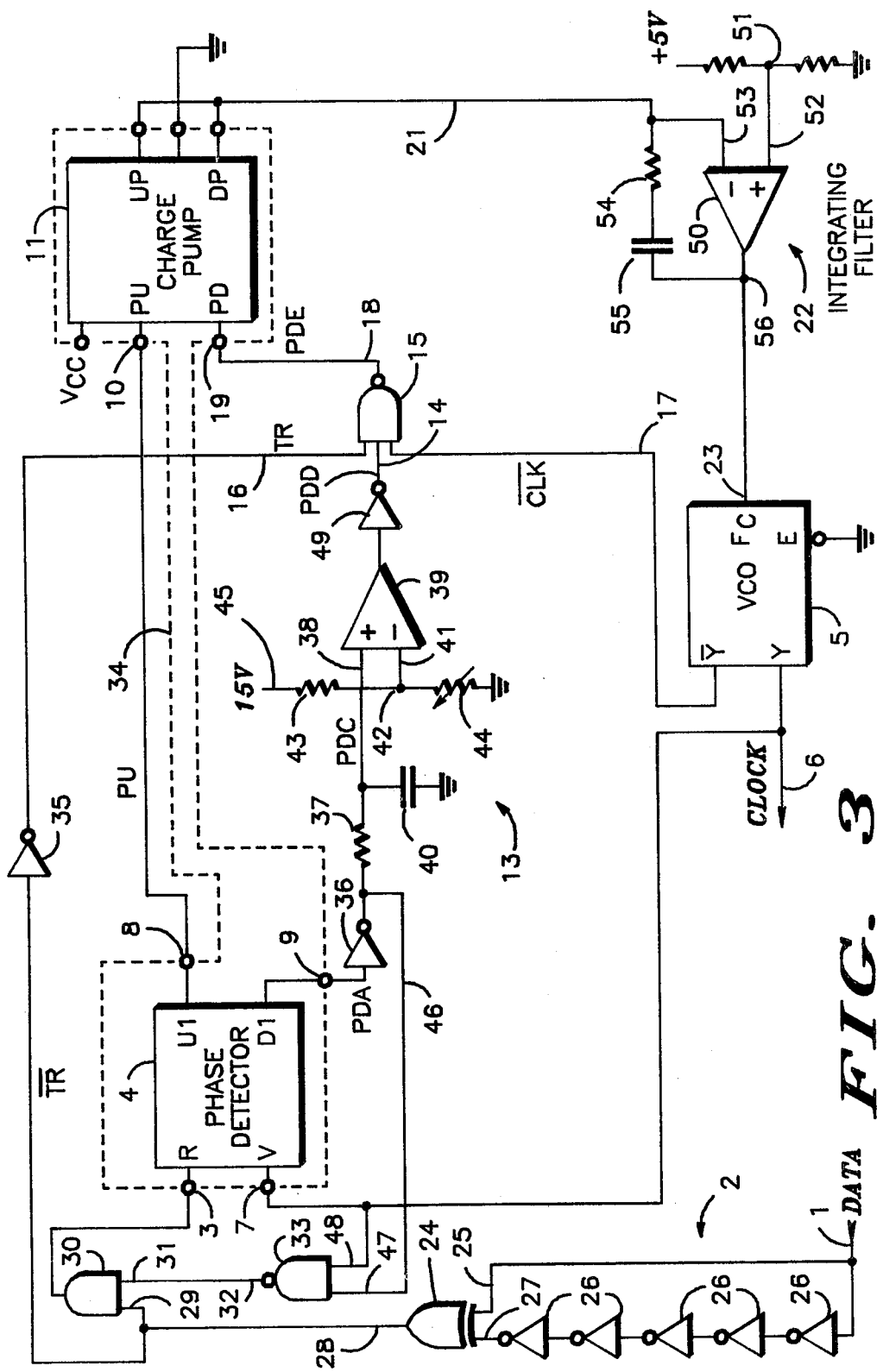
FIG. 3 shows the phase lock loop circuit arrangment of FIG. 2 in more detail.

Reference will now be made to FIG. 3 which shows a more detailed schematic diagram of the invention illustrated in FIG. 2 and to FIG. 4 which is an explanatory waveform diagram illustrating the operation of the circuit arrangement of FIG. 3.

Incoming data fed to the input terminal 1 of the arrangement is detected by the transition detector 2 which consists of an exclusive OR gate 24 which is typically a Motorola 74LS86. The data is fed directly to a first input 25 of the OR gate 24 and via five series connected inverting gates 26, typically Motorola 74LS04 gates, to a second input 27 of the OR gate 24. The OR gate 24 produces at an output 28 a negative going pulse for each transition of the data from one binary level to another.

The output pulse appearing at the output terminal 28 of the exclusive OR gate 24 is fed to one input 29 of an AND gate 30 whose output feeds the input 3 of the phase detector 4. The AND gate 30 has an enabling input 31 connected to the output 32 of a NAND gate 33 whose function will be described later. Suffice it to say for the present time that the input 31 of the AND gate 30 will usually be at a logical level of 1 and this will enable the gate 30 to pass the transition phase to the input 3 of the phase detector 4 where it is compared with the phase of the clock signal fed from the voltage controlled oscillator 5 to the second input 7 of the phase detector 4. The phase detector 4 and charge pump circuit 11 are shown enclosed by a dashed line box 34 indicating that these two circuits are formed as an integrated circuit which is typically a Motorola MC4044.

The transition pulse appearing at the output 28 of the exclusive OR gate 24 is fed via an inverter 35 typically a Motorola 74LS04 to the input 16 of the NAND gate 15 which is a Motorola 74LS10.

The output 8 of the phase detector 4 is connected directly to the pump up input 10 of the charge pump circuit 11 whilst the second output 9 is connected via the delay circuit 13 and the NAND gate 15 to the pump down input 19 of the charge pump circuit 11.

The delay circuit 13 will now be described in more detail. The output 9 of the phase detector 4 is connected via an inverting gate 36 and a series resistor 37 to the positive input 38 of a comparator 39 which is typically a Motorola MC3430. A capacitor 40 is connected between the input 38 of the comparator 39 and earth reference potential. A reference potential is applied to a second input 41 of the comparator 39, this reference potential being taken from the junction 42 between two resistors 43 and 44 connected in series between a reference potential 45 and earth potential. The resistor 44 is adjustable.

The inverting gate 36 in addition to being connected to the resistor 37 is connected via a line 46 to an input 47 of the NAND gate 33, a second input 48 of which is fed with the clock signal from the voltage controlled oscillator 5.

The circuit of FIG. 3 must deal with four possible cases and these are combined into a single diagram in FIG. 4. for the purpose of illustration. The four cases are (a) when the data and clock signals are in phase lock, (b) when the data is leading the clock, (c) when there is no data transition during a clock cycle and (d) when the phase of the clock signal is leading that of the data. Those portions of the FIG. 4 waveforms apertaining to each case are identified by arrows referenced with the appropriate case identification letters. Each waveform is identified by reference letters and corresponding letters are marked on FIG. 3 to indicate the point in the circuit of that figure where the waveform applies.

In case (a) in which the data and clock signals are locked in phase, the TR waveform in FIG. 4 which appears at the input 3 of the phase detector 4 will be in phase with the clock signal appearing at the input 7 of the phase detector. In this condition both the outputs 8 and 9 of the phase detector 4 remain inactive, i.e. logically high. When the output 9 is logically high the comparator 39 remains turned off and its output will remain at a logically high level. Consequently, the output 18 of the gate 15 as indicated by the waveform PDE in FIG. 4 will remain logically high and therefore so will the inputs 10 and 19 of the charge pump circuit 11. No correcting outputs will be provided by the charge pump circuit 11 and the frequency of the voltage controlled oscillator will remain unchanged.

Case (b) is the relatively straightforward case in which the phase of the data leads that of the clock. The negative going transition indicated by the waveform TR in FIG. 4 for this case (b) will now arrive in advance of the negative going CLK waveform transition at the clock input 7 of the phase detector. This transition will cause the output 8 of the phase detector to go low and to remain low until returned to a high level by the negative going edge of the clock signal. Consequently, a negative going pulse representative of the phase difference between the clock and data signals will appear at the output 8 of the phase detector 4 and this is shown in FIG. 4 by the pulse PU. This pulse is fed to the pump up input 10 of the charge pump 30 which produces a correcting output voltage for adjusting the frequency of the voltage controlled oscillator 5.

In case (c) no data transition occurs, as exemplified by the transmission of two consequtive zeros in the DATA waveform in FIG. 4. When the clock signal goes low as indicated by the waveform CLK in FIG. 4 for the case (c), the output 9 of the phase detector will go low (waveform PDA in FIG. 4). This output 9 will remain low until the phase detector is reset by means of a transition arriving at the input 3. When however, no data transition occurs, false adjustment of the voltage controlled oscillator would occur if this output 9 were connected directly to the pump down input 19 of the charge pump 11. This output is therefore stored until it is determined whether or not a data transition will occur during the clock cycle, and if no data transition occurs then adjustment of the frequency of the oscillator is prevented.

When the output 9 of the phase detector 4 goes low this is inverted by the gate 36 and the capacitor 40 begins to charge via the resistor 37. The comparator 39 turns on when the potential on the capacitor 40 applied to the positive input terminal 38 exceeds the threshold voltage applied to the negative input 41. This threshold is set fairly low. The capacitor charging is illustrated by the waveform PDC in FIG. 4 for the case (c).

When the comparator 39 turns on its output goes low and this is inverted by the inverter 49, typically a Motorola 74LS04, so that the input 14 to the gate 15 will go high as shown by the waveform PDD in FIG. 4. The gate 15 is enabled by means of a data transition appearing at its input 16 and in the absence of a transition during a clock cycle the gate 15 will remain blocked and consequently its output 18 will remain logically high as shown by the waveform PDE. Consequently, when no data transition occurs during a clock cycle the pump down input to the charge pump circuit 11 which is connected to the output 18 of the gate 15 will remain inactive i.e. logically high.

As pointed out earlier, the output 9 of the phase detector 4 will remain low until a transition is applied to its input 3. In the absence of a transition during a clock cycle the phase detector must be reset by means of a simulated transition applied to this input 3. Consequently the output 9 of the phase detector 4 is connected via the inverter 36 to the input 47 of the NAND gate 33, the second input 48 of which is connected to the clock signal fed from the voltage controlled oscillator 5.

Whilst the output 9 of the phase comparator 4 remains low the input 47 of the NAND gate 33 will be high. When the clock signal returns to high level the input 48 to that gate will also go high and consequently the output 32 of the gate will go low. This will cause a logical 0 to appear at the input 3 to the phase detector and to reset that detector. This resetting will return the output 9 of the phase detector to a high level and via the gate 33 a logical one will now appear at the input 31 of the AND gate 30, thereby enabling this gate for the next data transition.

Finally, case (d) will be considered in which the phase of the clock signal is leading that of the data and a data transition does occur during a clock cycle. As mentioned previously, when the negative going transition of the clock signal arrives this causes the output 9 of the phase detector 4 to go low. At this point in time it is not known whether a data transition will occur and therefore the delay circuit 13 must hold this event and must release a pulse representative of the phase difference between the clock and data signals at the time when the data transition does arrive.

When the output 9 goes low the capacitor 40 begins to charge and the input 14 to the gate 15 goes high when the comparator 39 turns ON. These events are indicated in FIG. 4 by the waveforms PDC and PDD respectively. As for case (c) no signal is as yet passed to the output 18 of the gate 15.

When a data transition does occur the gate 15 is enabled by means of the transition pulse appearing at its input 16. This gate opens and the output 18 goes low as shown by the waveform PDE. At the same time the output 9 will be returned to a logically high level and the capacitor 40 will start discharging through the resistor 37.

When the capacitor 40 has discharged such that the potential at the input 38 of the comparator 39 falls below the threshold voltage appearing at its input 41 the comparator 39 will turn off and the input 14 to the gate 15 will go low causing the output 18 of the gate to go high.

The output 18 of the gate 15 will therefore carry a pulse whose width is equal to the period of time during which the gate 15 is open and this pulse is fed to the pump down input 19 of the charge pump circuit 11 to cause that circuit to generate a voltage for adjusting the frequency of the voltage controlled oscillator in a downward direction.

The period of time during which the gate 15 is open is determined by the charge on the capacitor 40. This capacitor charges for a period of time representative of the phase difference between the clock and data signals and therefore the gate 15 will be open for a period also representative of this phase difference. Fine adjustment of this time period may be obtained by means of the resistor 44.

The delay circuit 13 and the gate 15 therefore effectively store a pulse of width equal to the phase difference between the clock and data signals during a clock cycle and only release this pulse when the data transition finally arrives following a transition of the clock signal.

The analogue adjusting voltages provided by the charge pump circuit 11 are fed over the line 21 to the integrating filter 22. This consists of an operational amplifier 50 having a source of reference potential 51 connected to its positive input 52 and the connecting line 21 from the charge pump circuit 11 being connected to its negative input 53. A series combination of a resistor 54 and a capacitor 55 are connected between the negative input 53 and the output 56 of the comparator 50. The output 56 of the comparator 50 is connected to the frequency control input 23 of the voltage controlled oscillator 5. The operational amplifier 50 is typically a Motorola MC1741.

The invention provides a cheap and satisfactory way of locking transmitted NRZ coded data to a locally generated clock signal and is particularly useful in teletext receivers.

Modifications may of course be made to the invention without departing from its scope. In particular although particular examples of components utilized in the circuit have been given other suitable commercially available components may be used in their place.

I claim:

1. A phase locked loop circuit arrangement for synchronizing an oscillator to a NRZ (Non-Return-to-Zero) data signal in which a transition from one potential level to another represents a data transition from one binary value to another; the arrangement including a controllable oscillator for providing a clock signal; a phase comparator for comparing the phases of the data and clock signals with one another; means for applying a control signal to adjust the oscillating frequency of the oscillator in dependence upon an amount by which the phase of the data leads that of the clock signal and vice-versa, the means for applying a control signal including means for inhibiting the application of a control signal to the oscillator during a cycle of the clock signal in which the phase of the clock signal leads that of the data and no data transition occurs, the phase comparator has a first output for providing an output signal indicative of the phase of the data leading that of the clock signal and a second output for providing an output signal indicative of the phase of the clock signal leading that of the data, the means for inhibiting the application of a control signal to the oscillator includes gating means coupled to the second output of the phase comparator and arranged to be enabled by a data transition, and the gating means is coupled to the second output of the phase comparator via a delay circuit which stores an output signal fed from the phase comparator and indicative of the phase of the clock signal leading that of the data during a clock cycle and which feeds to the gating means a signal representative of the phase difference between the clock and data signals following the arrival of a data transition during that clock cycle.

2. A phase-locked loop circuit arrangement as claimed in claim 1, wherein the storage circuit includes capacitive means arranged to be charged at the beginning of a clock cycle in which the phase of the clock signal leads that of the data and to be discharged on arrival during that cycle of a data transition, the charge on the capacitor on the arrival of the data transition being proportional to the time elapsed between the beginning of the clock cycle and the data transition.

3. A phase-locked loop circuit arrangement as claimed in claim 2, wherein the delay circuit includes a comparator having a first input coupled to the capacitive means and a second input coupled to a source of a reference potential, the comparator having an output coupled to the gating means.

4. A phase-locked loop circuit arrangement as claimed in claim 1, or claim 2 wherein means is provided for discharging the capacitive means at the end of a clock cycle in which the phase of the clock signal leads that of the data and in which no data transition occurs.

* * * * *